US009927969B2

(12) United States Patent
Brown et al.

(10) Patent No.: US 9,927,969 B2
(45) Date of Patent: *Mar. 27, 2018

(54) RENDERING OBJECT ICONS ASSOCIATED WITH AN OBJECT ICON

(71) Applicant: HEWLETT-PACKARD DEVELOPMENT COMPANY, L.P., Houston, TX (US)

(72) Inventors: Craig T. Brown, Cypress, TX (US); Dustin L. Hoffman, Cypress, TX (US); Peter M. On, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 478 days.

This patent is subject to a terminal disclaimer.

(21) Appl. No.: 14/823,822

(22) Filed: Aug. 11, 2015

(65) Prior Publication Data

US 2015/0346953 A1 Dec. 3, 2015

Related U.S. Application Data

(63) Continuation of application No. 12/372,681, filed on Feb. 17, 2009, now Pat. No. 9,141,275.

(51) Int. Cl.
| | |
|---|---|
| *G06F 3/0481* | (2013.01) |
| *G06F 3/0488* | (2013.01) |
| *G06F 3/0484* | (2013.01) |
| *G06F 17/30* | (2006.01) |
| *G06F 3/0482* | (2013.01) |

(52) U.S. Cl.
CPC .......... *G06F 3/0488* (2013.01); *G06F 3/0482* (2013.01); *G06F 3/04817* (2013.01); *G06F 3/04842* (2013.01); *G06F 17/30126* (2013.01)

(58) Field of Classification Search
CPC .................................................. G06F 3/04817
USPC .......................................................... 715/863
See application file for complete search history.

(56) References Cited

U.S. PATENT DOCUMENTS

| | | | | |
|---|---|---|---|---|
| 5,835,758 A * | 11/1998 | Nochur | .................. | G06F 17/21 |
| 7,093,201 B2 | 8/2006 | Duarte | | |
| 7,246,128 B2 * | 7/2007 | Jordahl | ............. | G06F 17/30601 |
| 7,460,495 B2 * | 12/2008 | Li | ..................... | H04L 29/06027 |
| | | | | 370/267 |
| 7,479,950 B2 * | 1/2009 | Dehlin | .................... | G06F 3/011 |
| | | | | 345/156 |
| 7,689,928 B1 * | 3/2010 | Gilra | ................... | G06F 3/04855 |
| | | | | 715/786 |
| 7,728,821 B2 * | 6/2010 | Hillis | .................. | G06F 3/04883 |
| | | | | 178/18.01 |
| 7,877,722 B2 * | 1/2011 | Duffy | .................... | G03F 7/7065 |
| | | | | 716/55 |
| 7,899,455 B2 * | 3/2011 | Ramer | ............. | G06F 17/30867 |
| | | | | 455/432.3 |

(Continued)

*Primary Examiner* — Reza Nabi
(74) *Attorney, Agent, or Firm* — Trop, Pruner & Hu

(57) ABSTRACT

A device detects objects touching a first object icon representing a folder on a touch sensitive display and then moving in generally opposing directions, where the folder includes a plurality of constituent elements. In response to the detecting, additional object icons are rendered to display on the touch sensitive display, each additional object icon representing a respective constituent element, where the additional object icons are rendered in a pattern around the first object icon. The pattern of the additional object icons is animated.

20 Claims, 5 Drawing Sheets

(56) References Cited

U.S. PATENT DOCUMENTS

| | | | |
|---|---|---|---|
| 2002/0101418 A1* | 8/2002 | Vernier | G06F 3/048 |
| | | | 345/418 |
| 2003/0043206 A1* | 3/2003 | Duarte | G06F 3/0482 |
| | | | 715/810 |
| 2007/0046643 A1* | 3/2007 | Hillis | G06F 3/04883 |
| | | | 345/173 |
| 2007/0226606 A1* | 9/2007 | Noyes | G06F 17/30699 |
| | | | 715/205 |
| 2007/0294297 A1* | 12/2007 | Kesteloot | G06F 17/30053 |
| 2008/0244454 A1* | 10/2008 | Shibaike | G06F 3/0482 |
| | | | 715/835 |
| 2009/0106696 A1* | 4/2009 | Duarte | G06F 3/0482 |
| | | | 715/828 |
| 2010/0039446 A1* | 2/2010 | Hillis | G06F 3/011 |
| | | | 345/629 |
| 2010/0077316 A1* | 3/2010 | Omansky | G06Q 10/10 |
| | | | 715/751 |
| 2010/0117979 A1* | 5/2010 | Hillis | G06F 3/04883 |
| | | | 345/173 |
| 2010/0138784 A1* | 6/2010 | Colley | G06F 3/04883 |
| | | | 715/810 |
| 2010/0315438 A1* | 12/2010 | Horodezky | G06F 3/0481 |
| | | | 345/661 |
| 2010/0318904 A1* | 12/2010 | Hillis | G06F 3/04883 |
| | | | 715/701 |
| 2011/0055696 A1* | 3/2011 | Dollar | G06F 3/0482 |
| | | | 715/702 |

* cited by examiner

US 9,927,969 B2

1

RENDERING OBJECT ICONS ASSOCIATED WITH AN OBJECT ICON

CROSS REFERENCE OF RELATED APPLICATION

This is a continuation of U.S. application Ser. No. 12/372,681, filed Feb. 17, 2009, which is hereby incorporated by reference.

BACKGROUND

Computer systems usually have a graphical user interface that enables a user to use a mouse to "click" or "double click" an icon on a display to view the contents of that icon. For example, if the icon represents a folder, double clicking on the icon will cause a new window to be shown on the display containing the constituent elements of the selected folder. The constituent elements may comprise additional folders and/or files. Searching the multiple folders may involve a great deal of clicking which can be cumbersome to the user.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
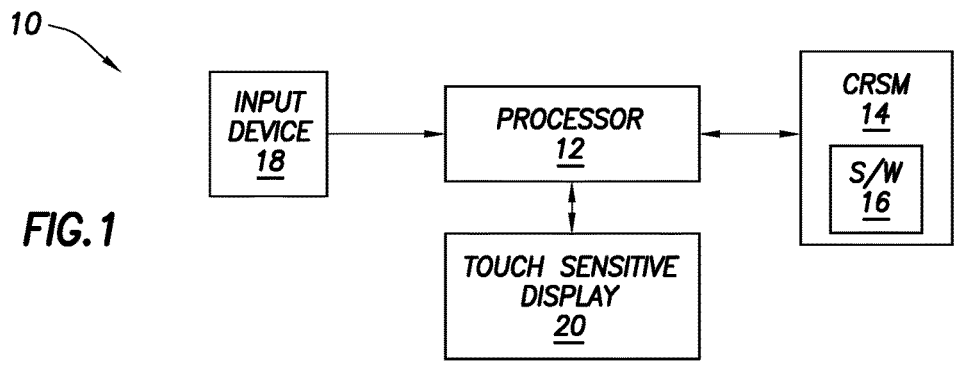
FIG. 1 shows a system in accordance with various embodiments comprising a touch-sensitive display.

FIG. 1 shows a system 10 in accordance with various embodiments. As shown in the illustrative embodiment of FIG. 1, system 10 comprises logic which preferably comprises a processor 12 coupled to a computer-readable storage medium (CRSM) 14. The system 10 also comprises an input device 18 (e.g., a mouse, trackball, keyboard, etc.) and a touch-sensitive display 20. The storage 14 comprises volatile storage (e.g., random access memory), non-volatile storage (e.g., hard disk drive, read-only memory, compact disc read only memory, Flash storage, etc.), or combinations thereof. Storage 14 preferably contains software 16 that is executable by processor 12 and, that when executed, causes the processor to perform some or all of the functionality described herein.

The touch-sensitive display 20 comprises any suitable type of touch-sensitive display such as a desktop flat panel monitor or a handheld display unit. In some embodiments, the entire system 10 is a hand-held unit, while in other embodiments, system 10 is not hand-held (e.g., a desktop system, notebook computer, etc.). Any of a variety of technologies can be used to detect a user's finger(s) on the display (e.g., capacitive, camera-based, etc.).

Figure 2:
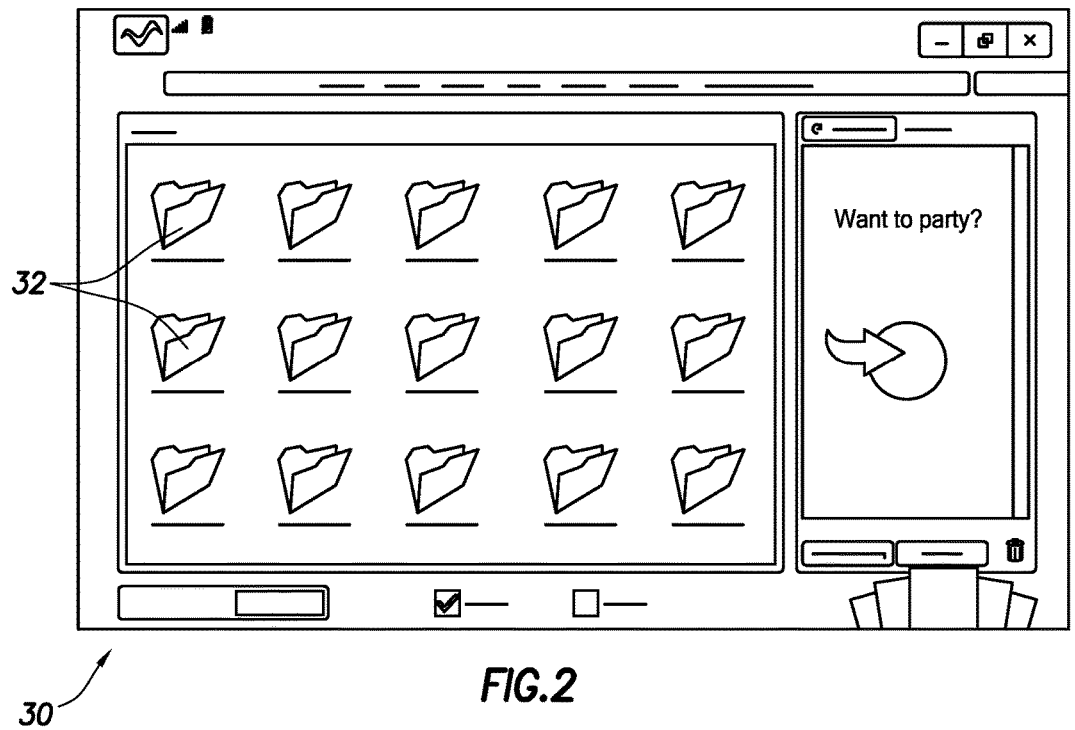
FIG. 2 illustrates various object icons rendered on the touch-sensitive display in accordance with various embodiments.

FIG. 2 illustrates a screen shot of a graphical user interface (GUI) 30 displayable on touch sensitive display 20. The GUI 30 comprises one more object icons 32. Each such object icon is a graphical symbol that represents and is associated with an object (i.e., a data structure). The data structure may comprise a folder, a directory, a file, etc. As a folder, for example, the object icon 32 permits a user to view the contents of such a folder. The contents of the folder may comprise additional folders, files, or combinations of folders and files. As noted above, using a mouse a user can click an object icon 32 representing the folder to view a list of the constituent elements (files, folders, etc.) of that folder.

In accordance with various embodiments, however, a user can select and view the contents of an object icon using a finger-based gesture on the touch sensitive display 20. FIGS. 3A-5 illustrate one exemplary gesture to view the contents of a displayed object icon. In the following explanation, the object being selected is referred to as a "base" or "first" object icon to distinguish it from the constituent elements, which themselves may be additional object icons, that are displayed when the base object icon is selected. Thus, a base object icon is selected and additional object icons are displayed as well that represent the constituent elements of the selected object icons. The use of the adjective "base" or "first" should not be construed as imparting any particular meaning to the associated object icon. One of the additional object icons itself can be selected to view its constituent elements and, at that point, the additional object icon being selected may be referred to as a "base" or "first" object icon. Thus, the object icons can be viewed in a nested fashion and base/first simply refers to the icon being selected.

Figure 3B:
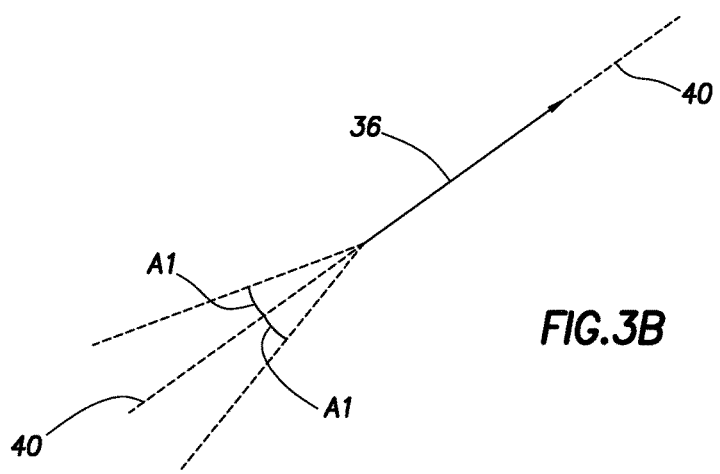
FIGS. 3A-5 illustrate a multi-finger gesture that causes the system to show additional object icons pertaining to a base object icon in accordance with various embodiments.
Figure 3A:
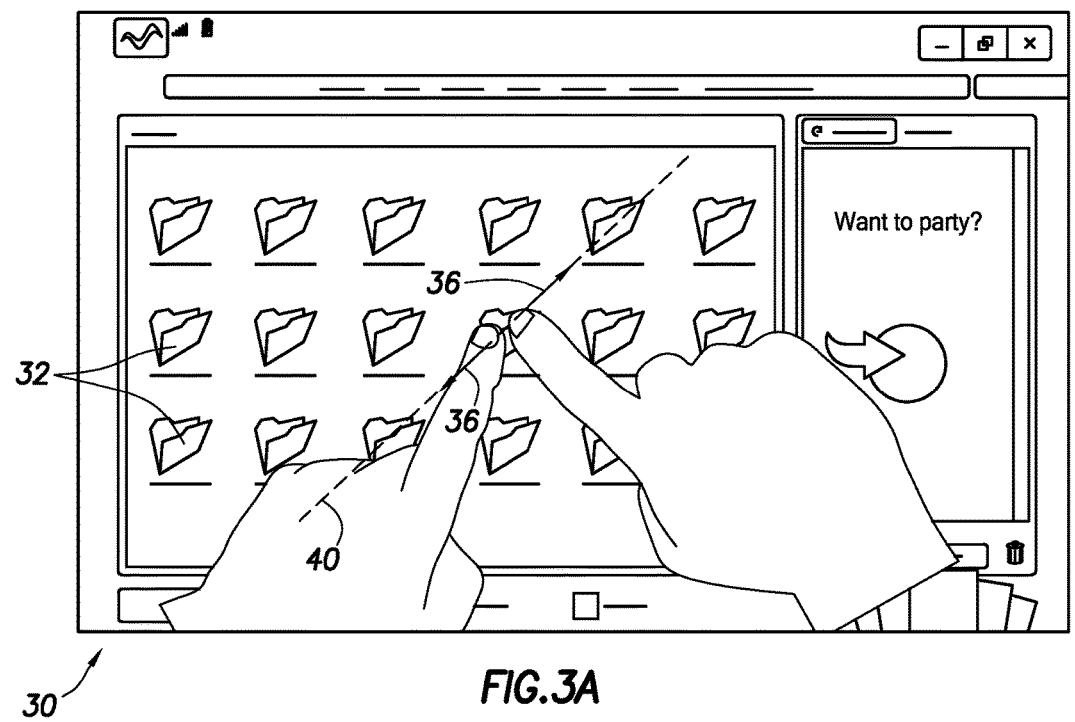

FIG. 3A illustrates a user placing two fingers on a base object icon 32 to be selected. The fingers the user uses may be on the left and right hands as shown or may be on the same hand (e.g., thumb and forefinger). The user then moves the fingers apart in generally opposing directions. The direction in which the fingers move apart can be any direction. Arrows 36 illustrate one suitable pair of directions for movement of the fingers along an axis 40. The axis 40 can be oriented differently from that shown. For example, the axis 40 along which the fingers move apart can be horizontal, vertical, or at any other desired orientation.

The fingers can move apart in exactly or approximately opposing directions. FIG. 3B illustrates one arrow 36 originating from a point at which the base object icon is located. The axis 40 is shown coinciding with the arrow 36. The opposing arrow 36 (not shown in FIG. 3B) is within an angle A1 of the axis 40. Angle A1 is in the range of 0 to 10 degrees in accordance with at least some embodiments.

Figure 4:
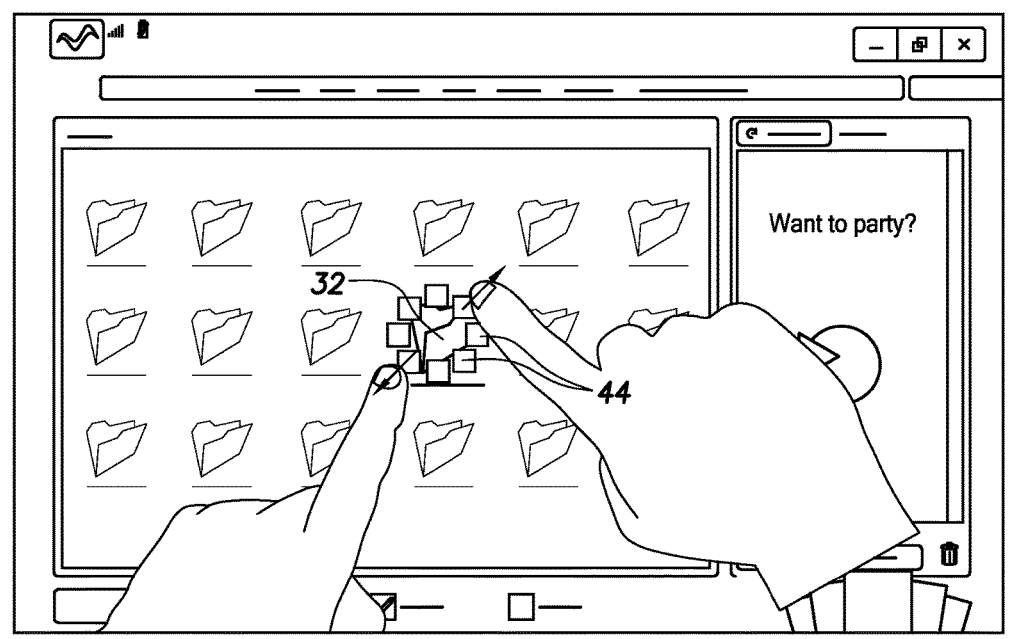

FIG. 4 illustrates the user's fingers beginning to move apart. As is shown, the object icons associated with the selected base object icon begin to appear (be rendered) on GUI 30. The object icons associated with the selected base object icon 32 are indicated by reference number 44. The size of the additional object icons 44 is a function of the distance between where the user's fingers touch the display 20. In some embodiments, the closer the fingers are together, the smaller will be the size of the additional object icons; the farther apart the fingers are, the larger will be the size of the additional object icons.

Figure 5:
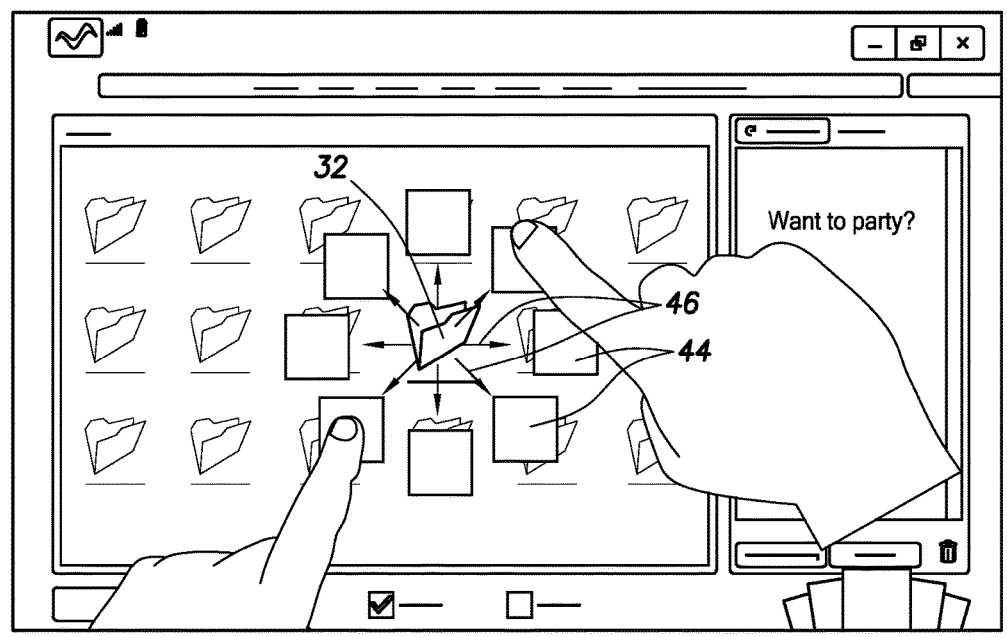

FIG. 5 illustrates that the user's fingers are farther apart than in FIG. 4. Accordingly, the size of the additional object icons 44 are bigger than in FIG. 4.

In addition to rendering the object icons associated with a selected base object icons, the system also renders arrows 46 from the selected base object icon to each of the additional object icons. Arrows 46 clarify to the user the association of object icons 44 to their base object icon 32.

As shown in FIGS. 4 and 5, the additional object icons 44 are shown in a generally circular pattern centered about the selected base object icon. Patterns other than circular can be used as well.

Figure 6:
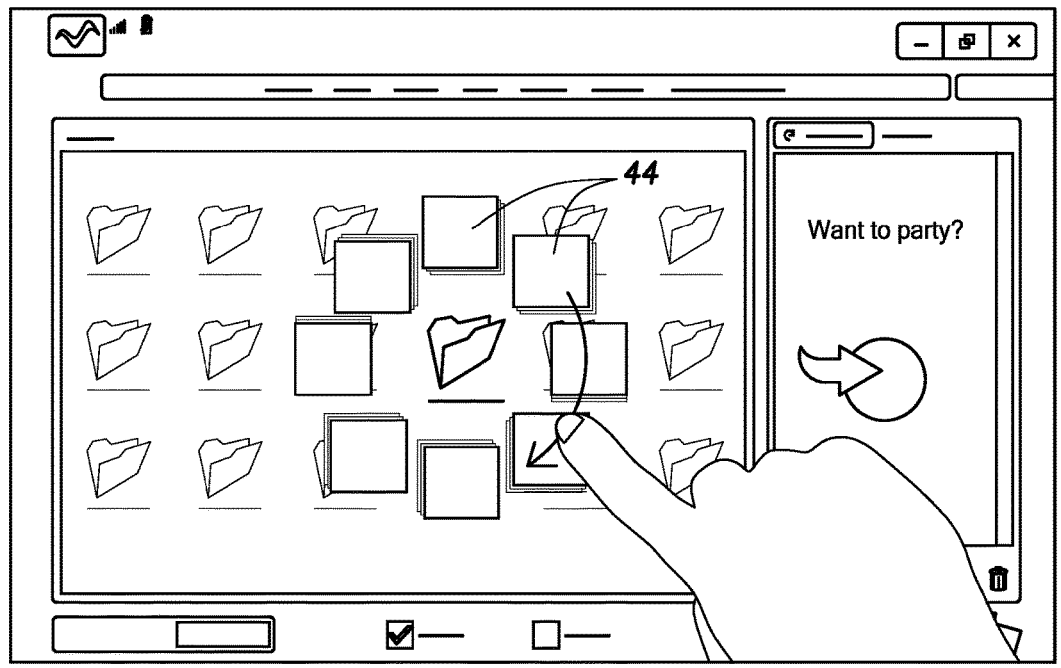
FIG. 6 illustrates a gesture that causes a pattern of the object icons to appear to spin about the base object icon in accordance with various embodiments.

FIG. 6 illustrates another gesture in which a user uses a single finger to touch one of the additional object icons 44 and moves the finger generally along the circular pattern in a generally curved motion. As a result, the pattern of additional object icons is animated to thereby make the pattern appear to spin about a central point coinciding with the base object icon. The pattern can be made to spin in either direction—clockwise or counterclockwise—depending on which direction the user moves his or her finger. The pattern can spin indefinitely until stopped by the user touching the pattern, or for a predetermined period of time. Once the processor causes the pattern to stop spinning, the processor can cause the pattern to begin spinning in the opposite direction if the user moves his finger in such direction.

Figure 7:
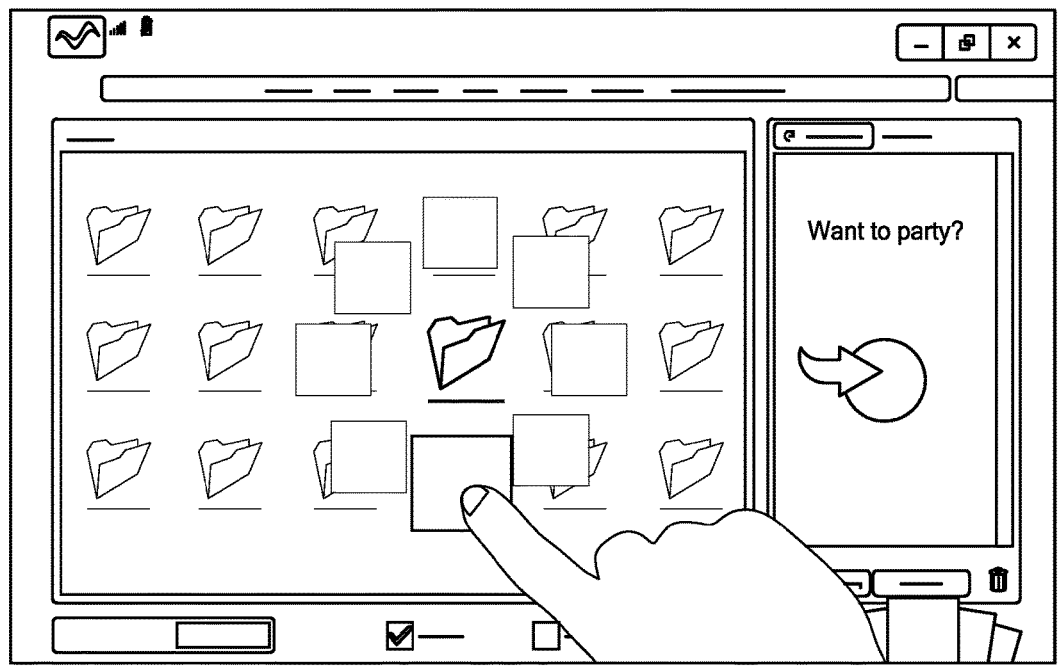
FIGS. 7 and 8 illustrate a gesture that selects one of the object icons to view its constituent objects in accordance with various embodiments.
Figure 8:
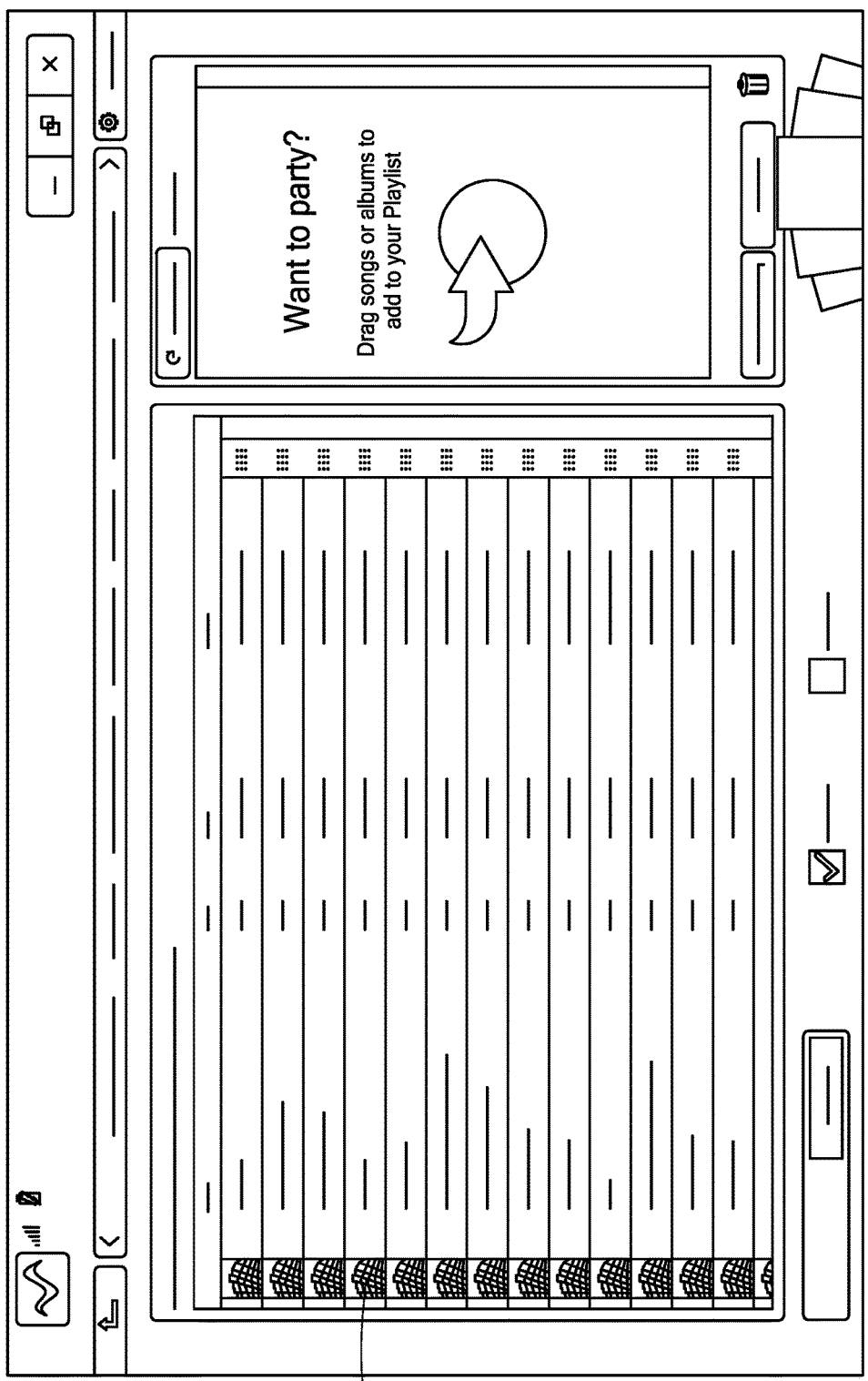

FIG. 7 illustrates a user selecting one of the additional object icons by double touching the touch sensitive display in rapid succession (e.g., two touches within two seconds). This gesture is akin to a user double clicking on the icon with a mouse. As a result, the constituent elements of the selected object icon are shown. An example is shown in FIG. 8 in which various audio files 50 are listed which were associated with the object icon selected in FIG. 7.

Figure 9:
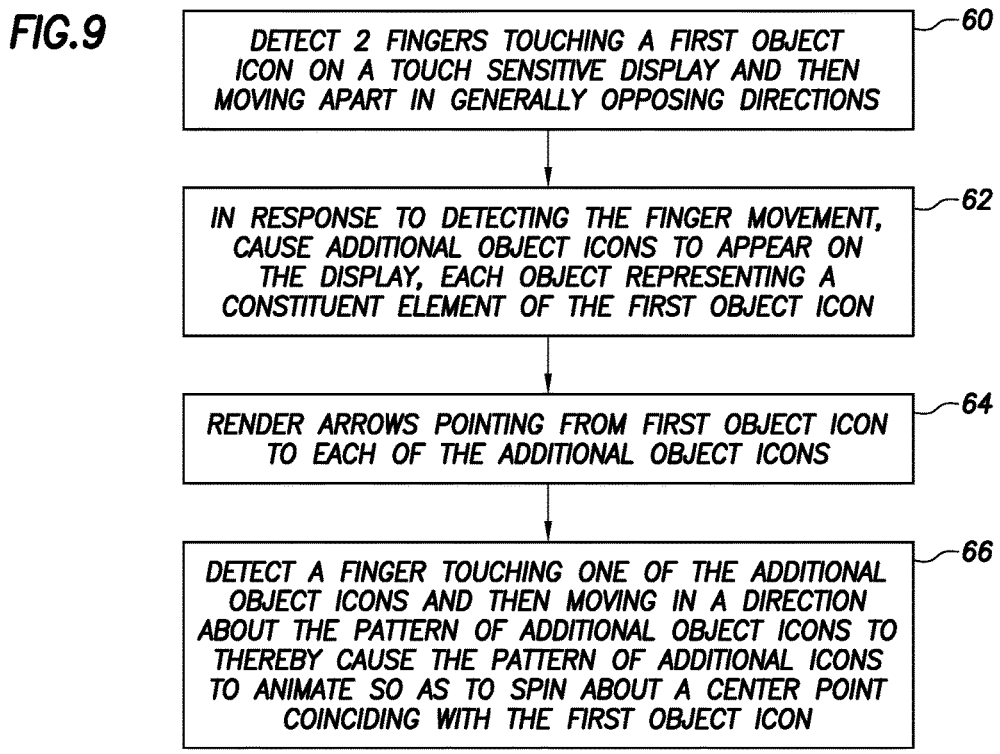
FIG. 9 shows a method in accordance with various embodiments.

FIG. 9 illustrates a method in accordance with various embodiments. The method is performed in some embodiments by the processor 12 executing software 16 (FIG. 1). At 60, the method comprises detecting two fingers touching (i.e., selecting) a first object icon on a touch sensitive display and moving apart in generally opposing directions. At 62, the method further comprises, in response to the detection of the finger movement from action 60, causing additional object icons to appear on the display. Each such additional object icons represent a constituent element of the first object icon selected at 60. At 64, arrows 46 are also rendered pointing from the first object icon to each of the additional object icons. At 66, the method comprises detecting a finger touching one of the additional object icons and then moving in a direction about the pattern of additional object icons (e.g., circular pattern). In response to the detection of the finger movement, the method comprises causing the pattern of additional object icons to animate so as to spin about a center point coinciding with the first object icon.

In some embodiments, the "spin" gesture of FIG. 6 and action 66 in FIG. 9 can be performed without first performing the object icon selection gesture depicted in FIGS. 3A-5. That is, however a group of related object icons are caused to be shown on display 20, the group of object icons can be made to spin as discussed above.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    detecting, by a device comprising a processor, objects touching a first object icon representing a folder on a touch sensitive display and then moving in generally opposing directions, the folder comprising a plurality of constituent elements;
    in response to the detecting, rendering for display, by the device, additional object icons on the touch sensitive display, each additional object icon of the additional object icons representing a respective constituent element of the plurality of constituent elements, wherein the additional object icons are rendered in a pattern around the first object icon; and
    causing, by the device, animation of the pattern of the additional object icons, the animation comprising moving the additional object icons without corresponding movement of the first object icon.

2. The method of claim 1, wherein the plurality constituent elements comprise files, and wherein rendering for display the additional object icons comprises rendering for display the additional object icons that represent the files.

3. The method of claim 1, wherein the plurality constituent elements comprise a further folder and a file, and wherein rendering for display the additional object icons comprises rendering for display the additional object icons that represent the further folder and the file.

4. The method of claim 1, wherein the moving of the additional object icons comprises spinning the additional object icons about the first object icon.

5. The method of claim 4, wherein the spinning of the additional object icons comprises spinning indefinitely the additional object icons until a user touch of the pattern is detected.

6. The method of claim 1, wherein the moving of the additional object icons comprises spinning the additional object icons about a center point corresponding to the first object icon.

7. The method of claim 1, wherein the causing of the animation of the pattern of the additional object icons comprises the causing of the animation of a generally circular pattern of the additional object icons.

8. The method of claim 1, wherein the causing of the animation of the additional object icons is in response to detecting an object touch of one of the additional object icons and then moving in a curved direction.

9. The method of claim 1, further comprising rendering an arrow pointing from the first object icon to each of the additional object icons.

10. A non-transitory computer readable storage medium storing instructions that upon execution cause a device to:
   detect user fingers touching a first object icon representing a folder on a touch sensitive display, the folder comprising a plurality of constituent elements;
   in response to the detecting, render for display additional object icons on the touch sensitive display, each additional object icon of the additional object icons representing a respective constituent element of the plurality of constituent elements, wherein the additional object icons are rendered in a pattern around the first object icon; and
   cause animation of the pattern of the additional object icons, the animation comprising moving the additional object icons without corresponding movement of the first object icon.

11. The non-transitory computer readable storage medium of claim 10, wherein the pattern comprises a generally circular pattern of the additional object icons around a center point corresponding to the first object icon.

12. The non-transitory computer readable storage medium of claim 11, wherein the animation comprises spinning the additional object icons around the center point without movement of the first object icon with the additional object icons.

13. The non-transitory computer readable storage medium of claim 12, wherein the spinning of the additional object icons comprises spinning indefinitely the additional object icons until a user touch of the pattern is detected.

14. The non-transitory computer readable storage medium of claim 10, wherein the plurality of constituent components represented by the additional object icons comprise at least one selected from among a further folder and a file.

15. The non-transitory computer readable storage medium of claim 10, wherein the causing of the animation of the additional object icons is in response to detecting a user finger touch of one of the additional object icons and then moving in a curved direction.

16. A device comprising:
   a touch-sensitive display; and
   at least one processor to:
      detect user fingers touching a first object icon representing a folder on a touch sensitive display and then moving in generally opposing directions, the folder comprising a plurality of constituent elements;
      in response to the detecting, render for display additional object icons on the touch sensitive display, each additional object icon of the additional object icons representing a respective constituent element of the plurality of constituent elements, wherein the rendered the additional object icons in a pattern around the first object icon; and
      cause animation of the pattern of the additional object icons, the animation comprising moving the additional object icons without corresponding movement of the first object icon.

17. The device of claim 16, wherein the pattern comprises a generally circular pattern of the additional object icons around a center point corresponding to the first object icon.

18. The device of claim 17, wherein the animation comprises spinning the additional object icons around the center point without movement of the first object icon with the additional object icons.

19. The device of claim 18, wherein the spinning of the additional object icons comprises spinning indefinitely the additional object icons until a user touch of the pattern is detected.

20. The device of claim 16, wherein the causing of the animation of the additional object icons is in response to detecting a user finger touch of one of the additional object icons and then moving in a curved direction.

* * * * *